United States Patent
Green

(10) Patent No.: US 8,983,638 B2
(45) Date of Patent: Mar. 17, 2015

(54) AUTOMATIC AUDIO TRACK SETUP

(75) Inventor: Peter Green, Kirkland, WA (US)

(73) Assignee: Adobe Systems Incorporated, San Jose, CA (US)

( * ) Notice: Subject to any disclaimer, the term of this patent is extended or adjusted under 35 U.S.C. 154(b) by 2280 days.

(21) Appl. No.: 11/365,081

(22) Filed: Feb. 28, 2006

(65) Prior Publication Data

US 2013/0123960 A1    May 16, 2013

(51) Int. Cl.
*G06F 17/00* (2006.01)
*G10H 1/00* (2006.01)
*G11B 27/034* (2006.01)
*G11B 27/34* (2006.01)
*H04H 60/04* (2008.01)

(52) U.S. Cl.
CPC .............. *G06F 17/00* (2013.01); *G10H 1/0041* (2013.01); *G11B 27/034* (2013.01); *G11B 27/34* (2013.01); *H04S 2400/15* (2013.01); *H04H 60/04* (2013.01)
USPC .............................................. 700/94

(58) Field of Classification Search
USPC .................. 700/94; 381/119, 80, 81; 369/3–4; 715/716, 723, 727–728
See application file for complete search history.

(56) References Cited

U.S. PATENT DOCUMENTS 6,052,471 A * 4/2000 Van Ryzin ...................... 381/85
2002/0193894 A1* 12/2002 Terada et al. .................... 700/94

* cited by examiner

*Primary Examiner* — Curtis Kuntz
*Assistant Examiner* — Andrew C Flanders
(74) *Attorney, Agent, or Firm* — Wolfe-SBMC

(57) ABSTRACT

Embodiments for automatic audio track setup are disclosed.

27 Claims, 6 Drawing Sheets

AUTOMATIC AUDIO TRACK SETUP

FIELD

This application pertains to the field of audio recording, and more particularly, to the field of setting up audio tracks.

BACKGROUND

In preparing for a recording session, a recording engineer may typically perform a variety of tasks, including manually setting up tracks in a recording platform to be used in the session. The recording platform may comprise a personal computer executing recording software or a dedicated recording device. The task of setting up tracks may include the recording engineer manually selecting options available in a recording/mixing software and/or firmware program. The engineer may select and/or create the tracks he/she expects to use for the session, and my also assign names to the selected/created tracks, among other functions. These operations are performed manually.

For larger sessions involving a relatively large number of tracks, the process of setting up the tracks can be tedious and time consuming. Also, for recording facilities where session profiles change often, for example recording a single track voice-over in one session then recording a large ensemble utilizing dozens of tracks in a subsequent session, the time-consuming nature of manually setting up tracks can reduce the operating efficiency of the recording facility.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

Figure 1:
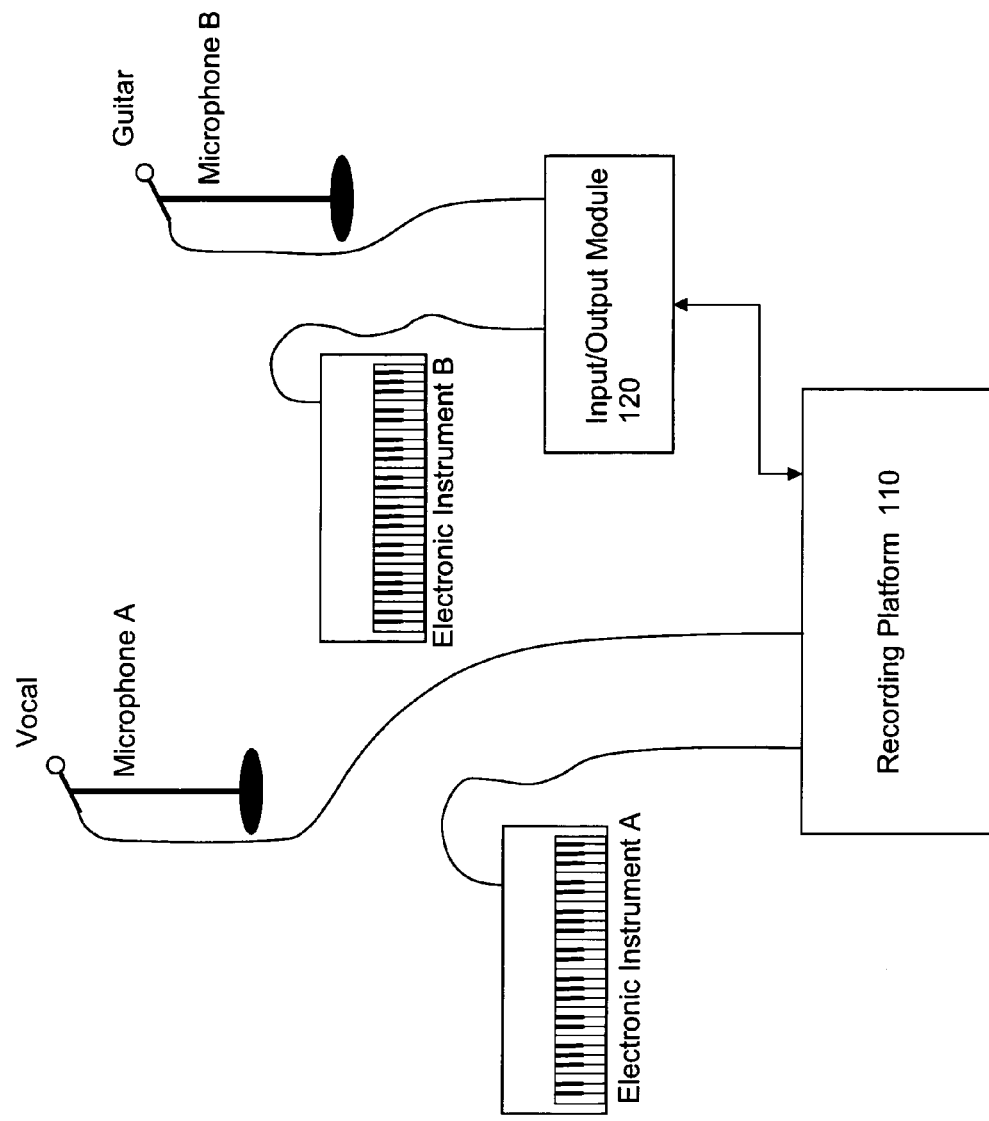
FIG. 1 is a diagram depicting an example recording session configuration.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of algorithms, programs and/or symbolic representations of operations on data bits or binary digital signals within a computer memory, for example. These algorithmic descriptions and/or representations may include techniques used in the data processing arts to convey the arrangement of a computer system and/or other information handling system to operate according to such programs, algorithms, and/or symbolic representations of operations.

An algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussions, it is appreciated that throughout the specification discussion utilizing terms such as processing, computing, calculating, determining, and/or the like, refer to the action and/or processes of a computer and/or computing system, and/or similar electronic computing device, that manipulate or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include apparatuses for performing the operations herein. This apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device and/or other information handling system.

The processes and/or displays presented herein are not inherently related to any particular computing device and/or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other.

Reference throughout this specification to one embodiment or an embodiment means that a particular feature, structure, or characteristic described in connection with the embodiment is included in at least one embodiment. Thus, the appearances of the phrase in one embodiment or an embodiment in various places throughout this specification are not necessarily all referring to the same embodiment. Furthermore, the particular features, structures, or characteristics may be combined in one or more embodiments.

Instructions as referred to herein relate to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. However, these are merely examples of an instruction, and the scope of the claimed subject matter is not limited in this respect.

Storage medium as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium, and the scope of the claimed subject matter is not limited in this respect.

Unless specifically stated otherwise, as apparent from the following discussion, it is appreciated that throughout this specification discussions utilizing terms such as processing, computing, calculating, selecting, forming, enabling, inhibiting, identifying, initiating, receiving, transmitting, determining and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

FIG. 1 is a diagram depicting an example recording session configuration. For this example, the recording session may include electronic instruments A and B as well as microphones A and B. Electronic instruments A and B for this example may comprise electronic keyboards, although the claimed subject matter is not limited in this regard. Also for this example session, microphone A may be used for a vocalist and microphone B may be used for a guitar. Electronic instrument B and microphone B for this example are coupled to an input/output module 120. Module 120 is coupled to recording platform 110. For the examples described herein, electronic instrument A is coupled to input 1 of recording platform 110. Microphone A is coupled to input 5. Also for the examples described herein, electronic instrument B is coupled to input 1 of module 120 and microphone B is coupled to input 8 of module 120. Of course, this is merely one example of a recording session configuration, and any of a wide range of configurations are possible. Recording platform 110 may comprise any of a wide range of inputs and may also receive signals from any of a wide range of devices capable of delivering analog and/or digital audio signals to a recording platform.

Input/Output module 120 for this example embodiment may comprise a recording interface including a number of inputs and outputs. The inputs may receive analog audio signals from electronic instruments, microphones, and/or other audio generation and/or audio transmission devices. Module 120 may comprise microphone pre-amplifiers and/or other signal processing circuitry. Module 120 may also comprise analog-to-digital converter circuitry capable of converting analog audio signals received at the inputs to the module into one or more digital signals suitable for transmission to recording platform 110. However, this is merely one example of an input/output module, and the claimed subject matter is not limited in these respects.

Recording platform 110 may comprise a personal computer capable of executing instructions included in recording software implemented in accordance with embodiments described herein. Alternatively, recording module 110 may comprise a dedicated recording device. The term "recording platform" as used herein is meant to include any device capable of executing software and/or firmware instructions and further capable of receiving and/or storing digital audio signals. However, these are merely examples of a recording platform, and the claimed subject matter is not limited in this regard.

For this example embodiment, recording platform 110 may automatically setup audio tracks by scanning the inputs of recording platform 110, including inputs provided by module 120, detecting which of the inputs have non-negligible signal activity, and creating and naming audio tracks corresponding to detected input signals. For example, an ensemble may be rehearsing. Audio signals from electronic instruments A and B as well as microphones A and B may be received at inputs of recording platform 110 and/or module 120. A recording engineer or other user may provide an input to recording platform 110 indicating to the platform to perform the automatic track setup operation. The recording platform 110 may comprise a graphical user interface capable of displaying track information and/or capable of receiving input from a user.

The example recording session configuration depicted in FIG. 1 is only one of a wide range of possible configurations. Sessions may range in size and complexity from a single vocalist or instrumentalist to very large ensembles. Track counts may range from a single mono track to dozens or even hundreds of mono and/or stereo tracks. Automated track setup as disclosed herein may greatly reduce the amount of time required to prepare for a recording session.

Figure 2:
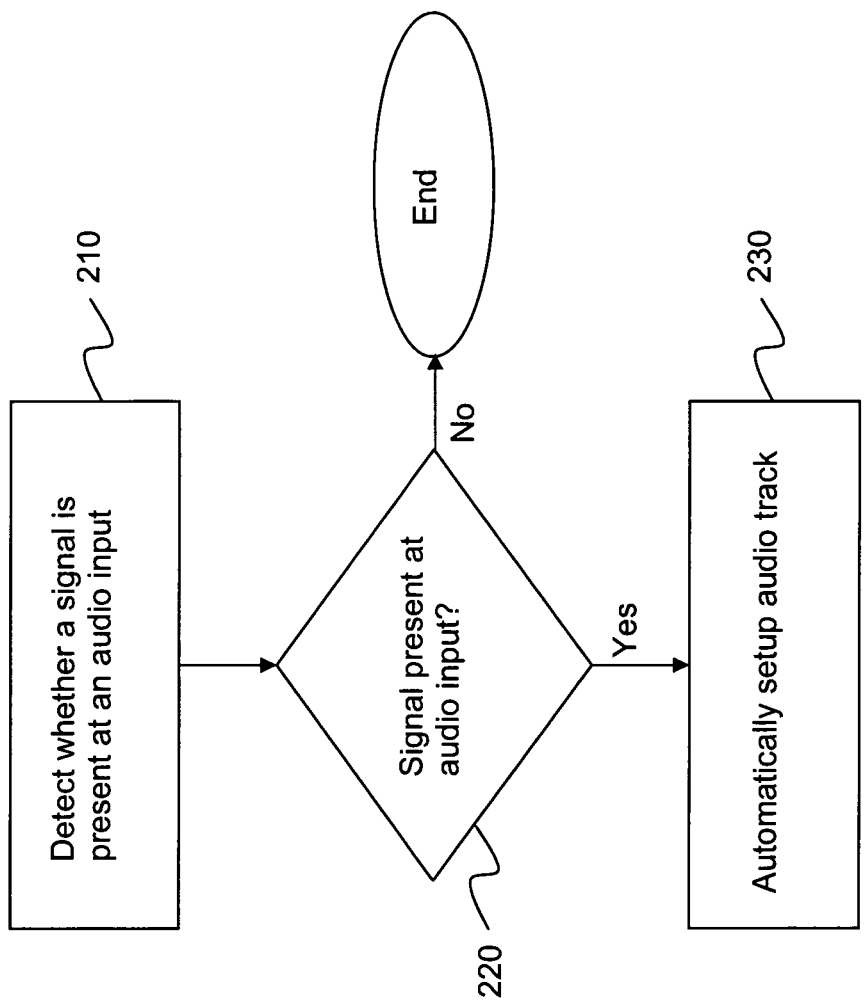
FIG. 2 is a flow diagram of one example embodiment of a method for automatically setting up an audio track.

FIG. 2 is a flow diagram of one example embodiment of a method for automatically setting up an audio track. At block 210, a detection operation is performed to determine whether a signal is present at an audio input. As shown at block 220, if no signal is present at the audio input, the process ends. However, if a signal is present at the audio input, an audio track is automatically setup at block 230. An embodiment in accordance with claimed subject matter may include all, more than all or less than all of blocks 210-230. Furthermore the order of blocks 210-230 is merely one example order, and the scope of the claimed subject matter is not limited in this respect.

As used herein, the term "present" when associated with an audio signal at an input is meant to indicate non-negligible activity. That is, meaningful audio information is being received at the input. For one embodiment, detecting whether a signal is present at an audio input may comprise determining whether an analog audio signal applied to the audio input exceeds a threshold voltage. For another embodiment, an analog audio signal presented to the input may be converted into a digital signal and compared against a threshold value. For one embodiment, the threshold may comprise a digital value of −60 dBFS. For another embodiment, a digital audio signal may be received at an input. The digital audio signal may be observed and compared with a threshold value. Again for this example the threshold may comprise a digital value of −60 dBFS. Other embodiments are possible using any of a wide range of analog and/or digital threshold values. The threshold value may be user-assignable (programmable) within the recording platform. Further, the above-mentioned embodiments for detecting whether a signal is present at an audio input are merely example embodiments, and the claimed subject matter is not limited in these respects. The various possible embodiments may be user-selectable within a recording platform.

Figure 3:
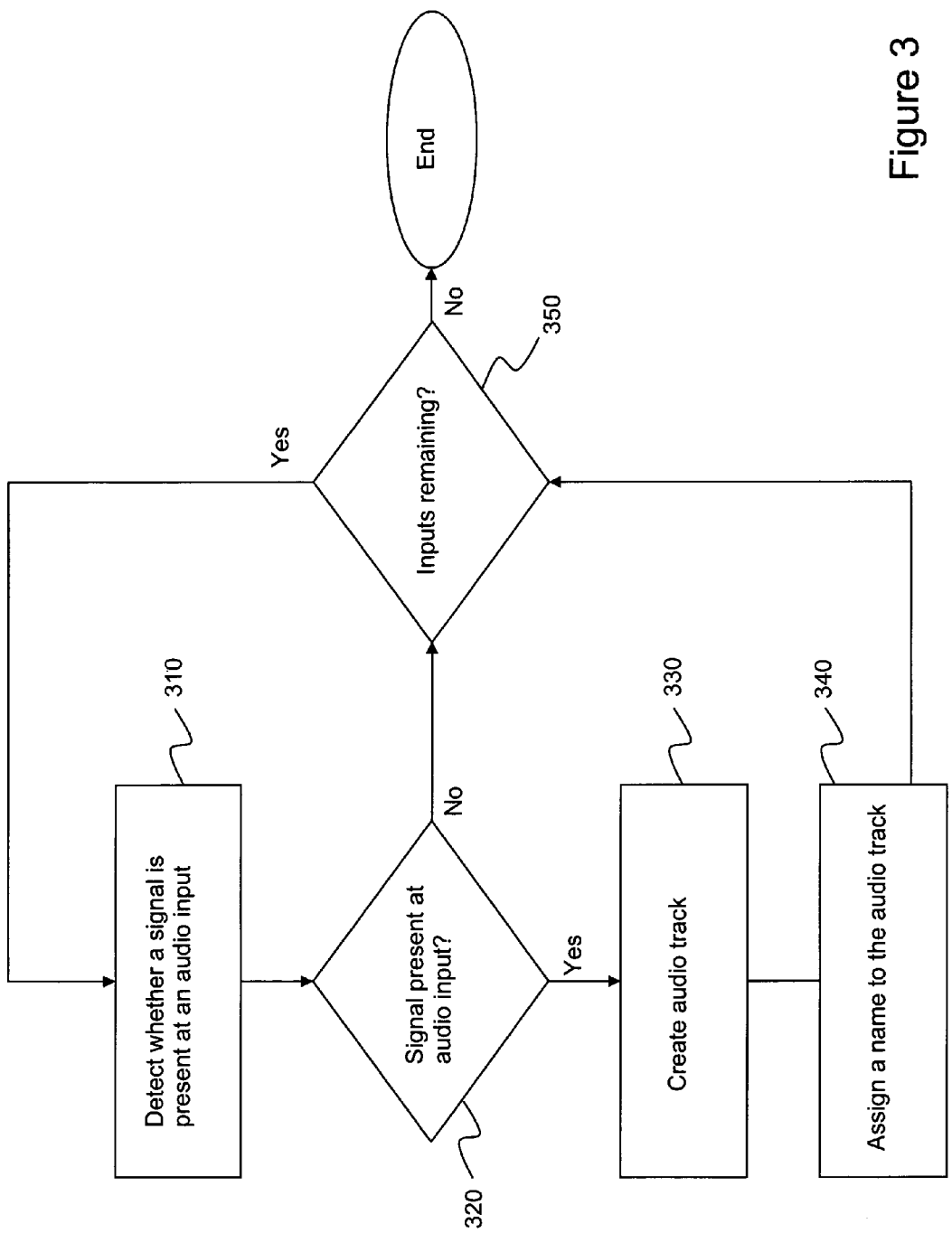
FIG. 3 is a flow diagram of an example embodiment of a method for automatically setting up one or more audio tracks.

FIG. 3 is a flow diagram of an example embodiment of a method for automatically setting up one or more audio tracks. For this example embodiment, a plurality of inputs are scanned to determine whether audio signals are present. At block 310, a determination is made as to whether a signal is present at an audio input. As indicated at block 320, if no signal is found a determination is made at block 350 as to whether additional inputs remain to be scanned. If a signal is found at the input, an audio track is created at block 330. The audio track is named at block 340. At block 350, a determination is made as to whether additional inputs remain to be scanned. If no additional inputs remain, processing ends. However, if additional inputs remain, processing returns to block 310 where an additional audio input is scanned. The process repeats for this example until all audio inputs have been scanned. An embodiment in accordance with claimed subject matter may include all, more than all or less than all of blocks 310-350. Furthermore the order of blocks 210-230 is merely one example order, and the scope of the claimed subject matter is not limited in this respect.

For some embodiments, prior to a recording platform performing automated track setup operations, the recording platform may be configured with a listing of inputs available on the recording platform and/or other hardware coupled to the recording platform, such as module 120 shown in FIG. 1. The listing of inputs may be updated whenever a hardware configuration changes. The detection and configuration of available inputs may be performed automatically. Alternatively, the recording platform may have a set configuration of inputs. Automated track setup operations such as those described above may occur in an iterative fashion until each of the available inputs has been checked for an active signal.

Figure 4:
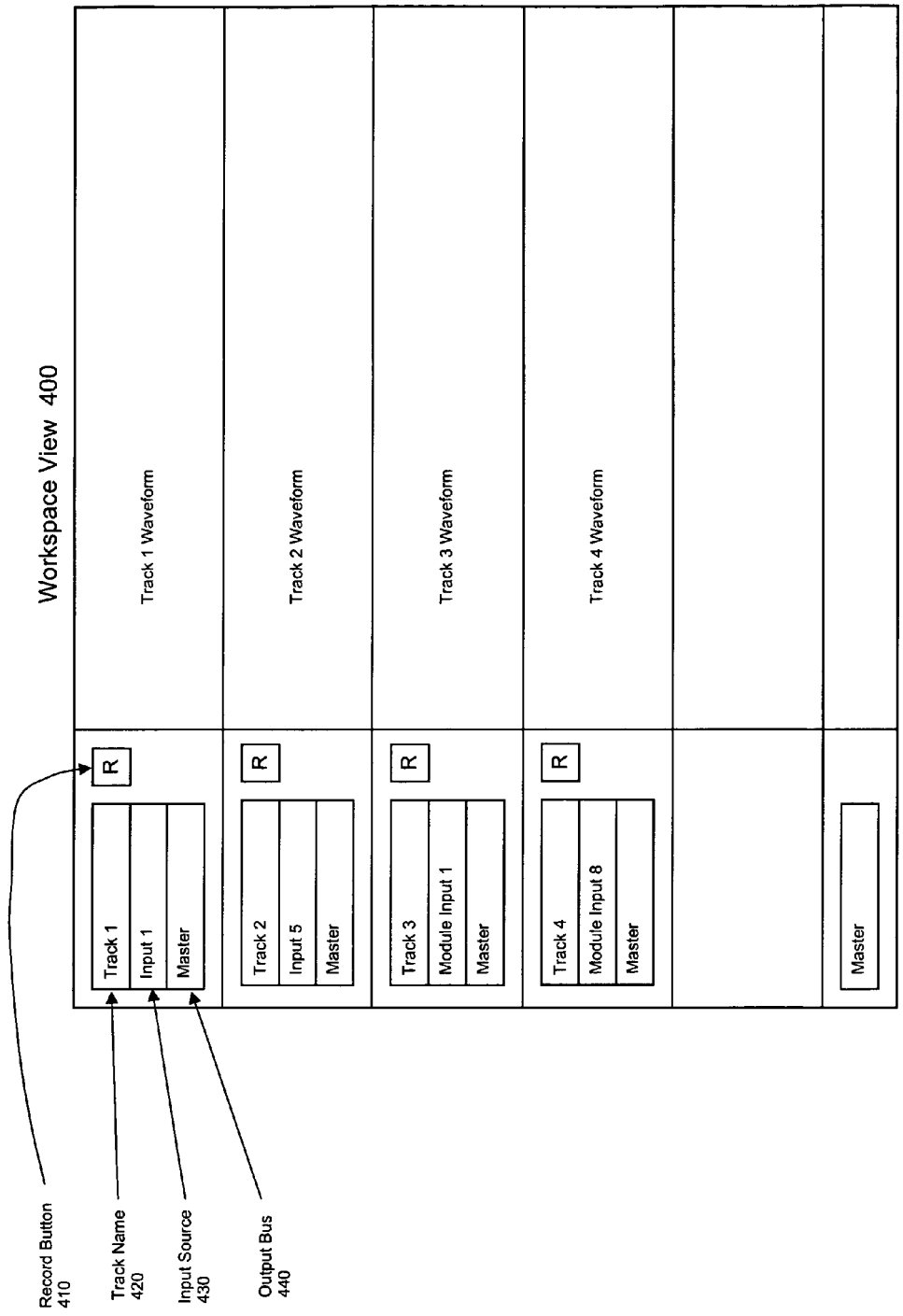
FIG. 4 is an illustration of a workspace view including multiple audio tracks as displayed by an example embodiment of recording device.
Figure 5:
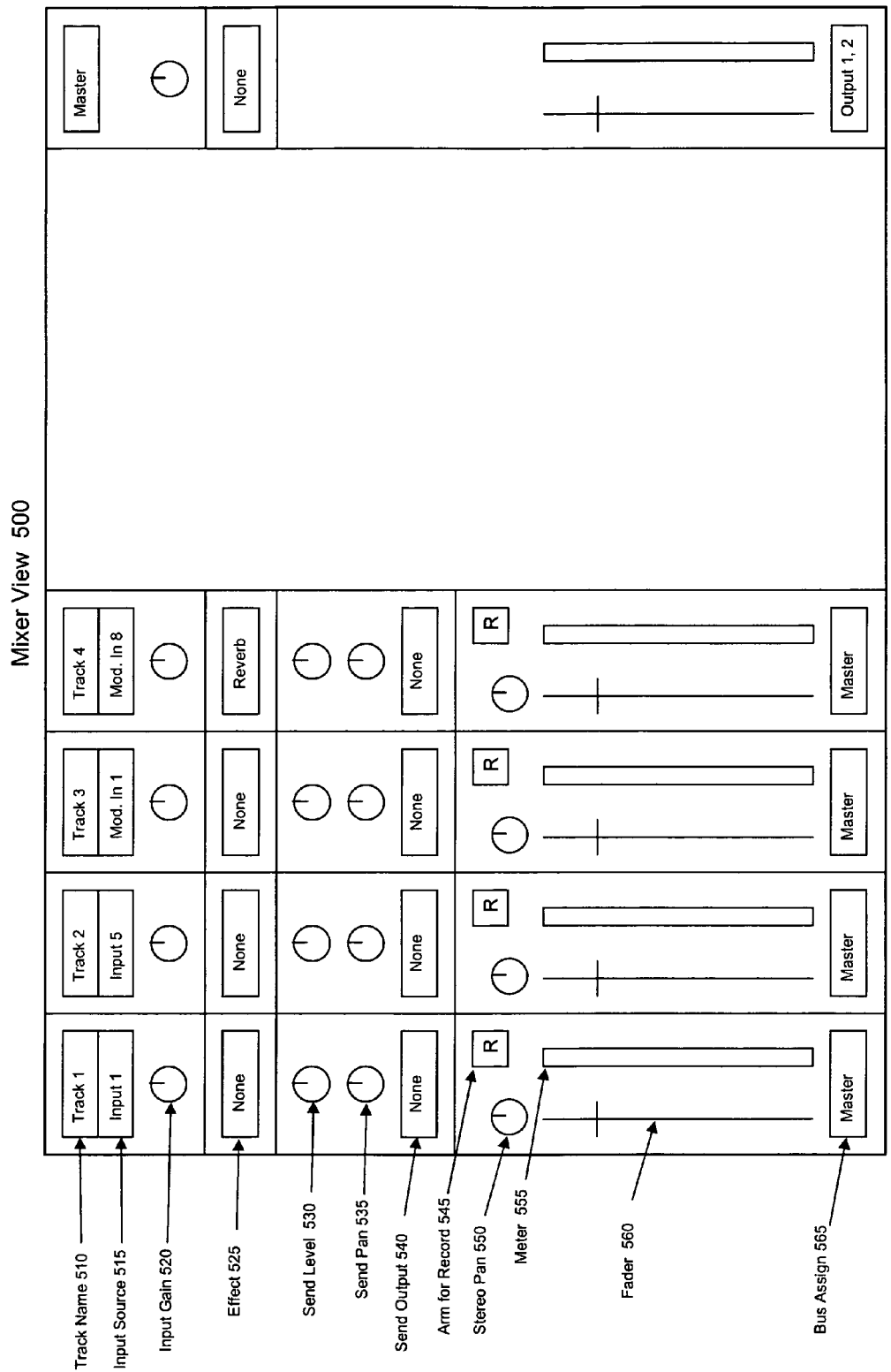
FIG. 5 is an illustration of a mixer view including multiple channel strips as displayed by an example embodiment of a recording device.

As used herein, the term "track creation" is meant to include any operation that may prepare a recording platform to store and/or process and/or playback audio information received at an input. Track creation may include associating an audio input with a storage file. Track creation may also include displaying information associated with the track on a display. Examples of some information that may be displayed are shown in FIGS. 4 and 5, discussed below. For an embodiment, in response to a creation of a track, the track may be record-enabled. These are merely examples of possible operations associated with track creation, and the claimed subject matter is not limited in these respects.

FIG. 4 is an illustration of a workspace view 400 including multiple audio tracks as displayed by an example embodiment of a recording device. The workspace view depicts an example of what information may be displayed upon completion of an automatic track setup operation performed in accordance with embodiments described herein. The information depicted in this example may correspond to automatic track setup for the example session depicted in FIG. 1. As a result of an automatic track setup operation, information for four newly-setup tracks are shown. For each track in this example, a track name 420 is included, as well as an indication of input source 430 and output bus selection 440. An indication of a record enable status 410 for each track is also provided. Also depicted are waveform display windows for the various tracks. Customized track names may also be provided by a user.

The input source indications depict the input source for the track. For example, for track 1, input 1 is indicated as the source. For track 2, input 5 is indicated. For track 3, module input 1 is indicated, and for track 4, module input 8 is indicated. The input source indications for the tracks correspond to the input configuration depicted in FIG. 1 and discussed above. Although for this example embodiment the track name is assigned a numerical name, other embodiments may have descriptive names assigned. The descriptive names may be assigned automatically or in other embodiments the names may be assigned manually.

For one embodiment, in addition to detecting a non-negligible signal on an input, the quality of the input signal may be determined. For example, analysis may be performed on a signal to determine the nature of the input source. For one example referring to FIG. 1, an analysis may be performed to determine the nature of the input source coupled to input 5. For this example, the analysis would determine that input 5 is receiving a signal initially generated by a vocal source. For one embodiment, the assigned track name may reflect the original source. For example, track 2 may be renamed "vocal."

For the example of FIG. 4, each track may also be assigned to an output bus. For this example embodiment, as part of the track setup process, the tracks are assigned to a master output bus. For other embodiments, tracks may be automatically assigned to other busses. For yet other embodiments, no output bus selection is made automatically. However, these are merely examples of output bus selection, and the claimed subject matter is not limited in these respects.

FIG. 5 is an illustration of a mixer view 500 including multiple virtual channel strips corresponding to four newly-setup tracks as displayed on a graphical user interface of an example embodiment of a recording device. Mixer view 500 may simulate a typical hardware mixing surface. Many embodiments are possible with a wide range of mixer configurations. For this example embodiment, each channel strip includes a track name indication 510, an input source indication 515, and an input gain virtual knob 520. Also included is a selection field for an effect 525. Virtual knobs for send level 530 and send pan 535 are included, as well as a send output selection field 540. An "arm for record" indicator 545 is further included. Also included are a stereo pan virtual knob 550, a virtual fader 560, and a meter 555. A bus assign field 565 is further included. For this example, the four channel strips correspond to the tracks depicted in FIG. 4, which in turn reflect the input signals detected by an automated track set-up operation.

Figure 6:
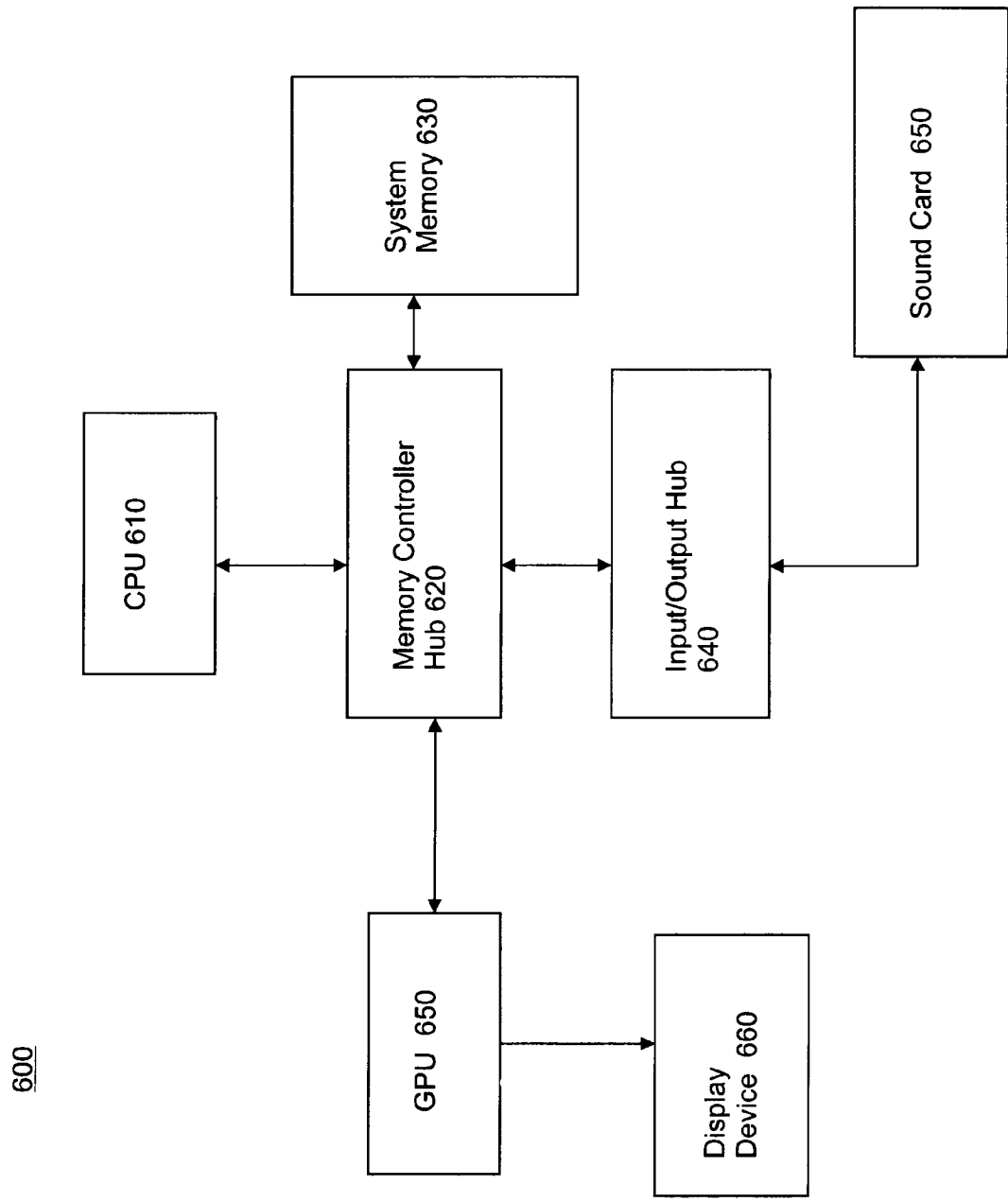
FIG. 6 is a block diagram of an example embodiment of a computing platform.

FIG. 6 is a block diagram of an example computing platform 600. The term "computing platform" as used herein is meant to include any electronic device capable of executing software or firmware instructions. For one or more embodiments, computing platform 600 may serve as a recording platform. Platform 600 may be used to perform some or all of the various functions discussed above in connection with FIGS. 1-5. Platform 600 for this example embodiment includes a central processing unit (CPU) 610 and a memory controller hub 620 coupled to CPU 610. Memory controller hub 620 may further be coupled to a system memory 630, to a graphics processing unit (GPU) 650, and to an input/output hub 640. GPU 650 may further be coupled to a display device 660, which may comprise a CRT display, a flat panel LCD display, or other type of display device. A sound card 650 may be coupled to Input/Output Hub 640. Sound card 650 may provide connectivity with musical instruments, microphones, and/or other audio generation and/or audio transmission devices. Although example system 600 is shown with a particular configuration of components, other embodiments are possible using any of a wide range of configurations.

One or more of the embodiments described herein may be implemented in hardware, such as implemented to operate on a device or combination of devices, for example, whereas other embodiments may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in operations in accordance with claimed subject matter being performed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example. It will, of course, be understood that, although particular embodiments have just been described, claimed subject matter is not limited in scope to a particular embodiment or implementation.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
   detecting the presence of an audio signal at an audio input of an audio recording platform; and
   in response to said detecting:
      automatically creating an audio track in the audio recording platform, wherein said creating comprises assigning resources of the audio recording platform to the audio track for recording the audio signal on the audio track, and wherein said recording comprises storing the audio track in a computer-readable storage medium; and
      automatically specifying the audio input as the input recording source for the audio track.

2. The method of claim 1, wherein said detecting and said creating are performed for a plurality of audio inputs, and wherein a different audio track is automatically created for each one of the plurality of audio inputs.

3. The method of claim 1, wherein said detecting comprises detecting a non-negligible digital audio signal.

4. The method of claim 3, wherein said detecting the non-negligible audio signal comprises converting an analog signal received at the audio input into a digital audio signal and determining whether the digital audio signal exceeds a specified threshold.

5. The method of claim 3, wherein said detecting the non-negligible audio signal comprises receiving a digital audio signal at the audio input and determining whether the digital audio signal exceeds a specified threshold comprising a value of approximately −60 dBFS.

6. The method of claim 1, wherein said automatically creating the audio track further comprises displaying a channel strip associated with the audio track.

7. The method of claim 1, wherein said automatically creating the audio track further comprises displaying a mixer channel associated with the audio track.

8. The method of claim 1, wherein said automatically creating the audio track further comprises naming the audio track with a name corresponding to the audio input.

9. The method of claim 1, wherein said detecting comprises detecting whether the audio signal is present at least in part in response to receiving an input from a user.

10. An article comprising: a non-transitory storage medium having stored thereon instructions that, in response to being executed by a processor of an audio recording platform, result in:
   detecting the presence of an audio signal at an audio input of the audio recording platform; and
   in response to said detecting:
      automatically creating an audio track in the audio recording platform, wherein said creating comprises assigning resources of the audio recording platform to the audio track for recording the audio signal on the audio track, and wherein said recording comprises storing the audio track in a computer-readable storage medium;
      automatically specifying the audio input as the input recording source for the audio track.

11. The article of claim 10, wherein the non-transitory storage medium has stored thereon further instructions that, in response to being executed, result in said detecting and said creating being performed for a plurality of audio inputs, and wherein a different audio track is automatically created for each one of the plurality of audio inputs.

12. The article of claim 10, wherein the non-transitory storage medium has stored thereon further instructions that, in response to being executed, result in said detecting comprising detecting a non-negligible audio signal.

13. The article of claim 12, wherein the non-transitory storage medium has stored thereon further instructions that, in response to being executed, further result in detecting the non-negligible audio signal by converting an analog signal received at the audio input into a digital audio signal and by determining whether the digital audio signal exceeds a specified threshold.

14. The article of claim 12, wherein the non-transitory storage medium has stored thereon further instructions that, in response to being executed, further result in detecting the non-negligible audio signal by receiving a digital audio signal at the audio input and by determining whether the digital audio signal exceeds a specified threshold comprising a value of approximately −60 dBFS.

15. The article of claim 10, wherein the non-transitory storage medium has stored thereon further instructions that, in response to being executed, result in said automatically creating the audio track further comprising displaying a channel strip associated with the audio track.

16. The article of claim 10, wherein the non-transitory storage medium has stored thereon further instructions that, in response to being executed, result in said automatically creating the audio track further comprising displaying a mixer channel associated with the audio track.

17. The article of claim 10, wherein the non-transitory storage medium has stored thereon further instructions that, in response to being executed, result in said automatically creating the audio track further comprising naming the audio track with a name corresponding to the audio input.

18. The article of claim 10, wherein the non-transitory storage medium has stored thereon further instructions that, in response to being executed, result in said detecting further comprising detecting whether the audio signal is present at least in part in response to receiving an input from a user.

19. An apparatus, comprising:
 means for detecting the presence of an audio signal at an audio input of an audio recording platform; and
 means for, in response to said detecting, automatically creating an audio track in the audio recording platform, wherein said creating comprises assigning resources of the audio recording platform to the audio track for recording the audio signal on the audio track, and wherein said recording comprises storing the audio track in a computer-readable storage medium;
 means for, in response to said detecting, automatically specifying the audio input as the input recording source for the audio track.

20. The apparatus of claim 19, wherein said means for detecting and said means for creating are performed for a plurality of audio inputs, and wherein a different audio track is automatically created for each one of the plurality of audio inputs.

21. The apparatus of claim 19, wherein the means for detecting comprises means for detecting a non-negligible audio signal.

22. The apparatus of claim 21, wherein said means for detecting the non-negligible audio signal comprises means for converting an analog audio signal received at the audio input into a digital audio signal and further comprises means for determining whether the digital audio signal exceeds a specified threshold.

23. The apparatus of claim 21, wherein said means for detecting the non-negligible audio signal comprises means for receiving a digital audio signal at the audio input and determining whether the digital audio signal exceeds a the specified threshold comprising a value of approximately −60 dBFS.

24. The apparatus of claim 19, wherein said means for automatically creating the audio track further comprises means for displaying a channel strip associated with the audio track.

25. The apparatus of claim 19, wherein said means for automatically creating the audio track further comprises means for displaying a mixer channel associated with the audio track.

26. The apparatus of claim 19, wherein said means for automatically creating the audio track further comprises means for naming the audio track with a name corresponding to the audio input.

27. The apparatus of claim 19, wherein said means for detecting comprises means for detecting whether the audio signal is present at least in part in response to receiving an input from a user.

* * * * *